United States Patent
Epps et al.

(10) Patent No.: US 8,334,872 B2
(45) Date of Patent: Dec. 18, 2012

(54) INVERSE KINEMATICS FOR MOTION-CAPTURE CHARACTERS

(75) Inventors: Doug Epps, Novato, CA (US); Nate Reid, Novato, CA (US)

(73) Assignee: Two Pic MC LLC, Burbank, CA (US)

( * ) Notice: Subject to any disclaimer, the term of this patent is extended or adjusted under 35 U.S.C. 154(b) by 728 days.

(21) Appl. No.: 12/495,488

(22) Filed: Jun. 30, 2009

(65) Prior Publication Data

US 2010/0302258 A1     Dec. 2, 2010

Related U.S. Application Data

(60) Provisional application No. 61/182,582, filed on May 29, 2009.

(51) Int. Cl.
*G06T 15/00* (2006.01)

(52) U.S. Cl. ........ 345/474; 345/420; 345/473; 345/475; 345/582

(58) Field of Classification Search ........... 345/420, 345/473, 474, 475, 582
See application file for complete search history.

(56) References Cited

U.S. PATENT DOCUMENTS

| | | | |
|---|---|---|---|
| 7,791,608 B2 * | 9/2010 | Henson et al. | 345/474 |
| 7,843,454 B1 * | 11/2010 | Biswas | 345/473 |
| 7,952,577 B2 * | 5/2011 | Harvill | 345/420 |
| 7,969,447 B2 * | 6/2011 | Scheepers et al. | 345/582 |
| 8,139,068 B2 * | 3/2012 | Isner et al. | 345/474 |

OTHER PUBLICATIONS

European Search Report of Jul. 23, 2010.

Wilbers, Freerk, et al., "A Blendshape Model for Mapping Facial Motions to an Android," Intelligent Robots and Systems, 2007, IROS 2007, IEEE/RSJ International Conference on, IEEE, Piscataway, NJ, pp. 542-547 (Oct. 29, 2007).

Blanz, Volker, et al., "A Morphable Model for the Synthesis of 3D Faces," Computer Graphics Proceedings, Siggraph 99; [Computer Graphic Proceedings. Siggraph], ACM—New York, NY, pp. 187-194, (Aug. 8, 1999).

Yin, Bao-Cai, et al., "MPEG-4 compatible 3D facial animation based on morphable model," Machine Learning and Cybernetics, 2005. Proceedings of 2005 International Conference on Guangzhou, China Aug. 18-21, 2005, pp. 4936-4941, vol. 8, (Aug. 18, 2005).

Pei, Yuru, et al., "Transferring of Speech Movements from Video to 3D Face Space," IEEE Transactions on Visualization and Computer Graphics, IEEE Service Center, Los Alamitos, CA, vol. 12, No. 1, pp. 58-69, (Jan. 1, 2007).

(Continued)

*Primary Examiner* — Phu K Nguyen
(74) *Attorney, Agent, or Firm* — Kilpatrick Townsend and Stockton, LLP

(57) ABSTRACT

A method for a computer system comprising receiving a displacement for a first object model surface from a user determined in response to a first physical motion captured pose, determining a weighted combination of a first displacement group and a second displacement group from the displacement, wherein the first displacement group is determined from displacements between the first object model surface and a second object model surface, wherein the second object model surface is determined from displacements between a second physical motion captured pose, wherein the second displacement group is determined from displacements between the first object model surface and a third object model surface, wherein the third object model surface is determined from a third physical motion captured pose, determining a fourth object model surface from the first object model surface and the weighted combination, and displaying the fourth object model surface to the user on a display.

16 Claims, 8 Drawing Sheets

OTHER PUBLICATIONS

Bascle, B., et al., "Separability of pose and expression in facial tracking and animation," 6th International Conference on Computer Vision. ICCV '98 Bombay, Jan. 4-7, 1998; [IEEE International Conference on Computer Vision], New York, NY, pp. 323-326, (Jan. 1, 1998).

Lu, Xiaoguang, et al., "Deformation Modeling for Robust 3D Face Matching," IEEE Transactions on Pattern Analysis and Machine Intelligence, IEEE Service Center, Los Alamitos, CA, vol. 30, No. 8, pp. 1346-1357 (Aug. 1, 2008).

Kouadio, Cyriaque, et al., "Real-Time Facial Animation based upon a Bank of 3D Facial Expressions," Computer Animation 98. Proceedings Philadelphia, PA USA Jun. 8-10, 1998, Los Alamitos, CA, pp. 128-136 (Jun. 8, 1998).

Mueller, P., et al., "Realistic speech animation based on observed 3-D face dynamics Visual Media Production," IEE Proceedings: Vision, Image and Signal Processing, Institution of Electrical Engineers, pp. 491-500, vol. 152, No. 4, (Aug. 5, 2005).

* cited by examiner

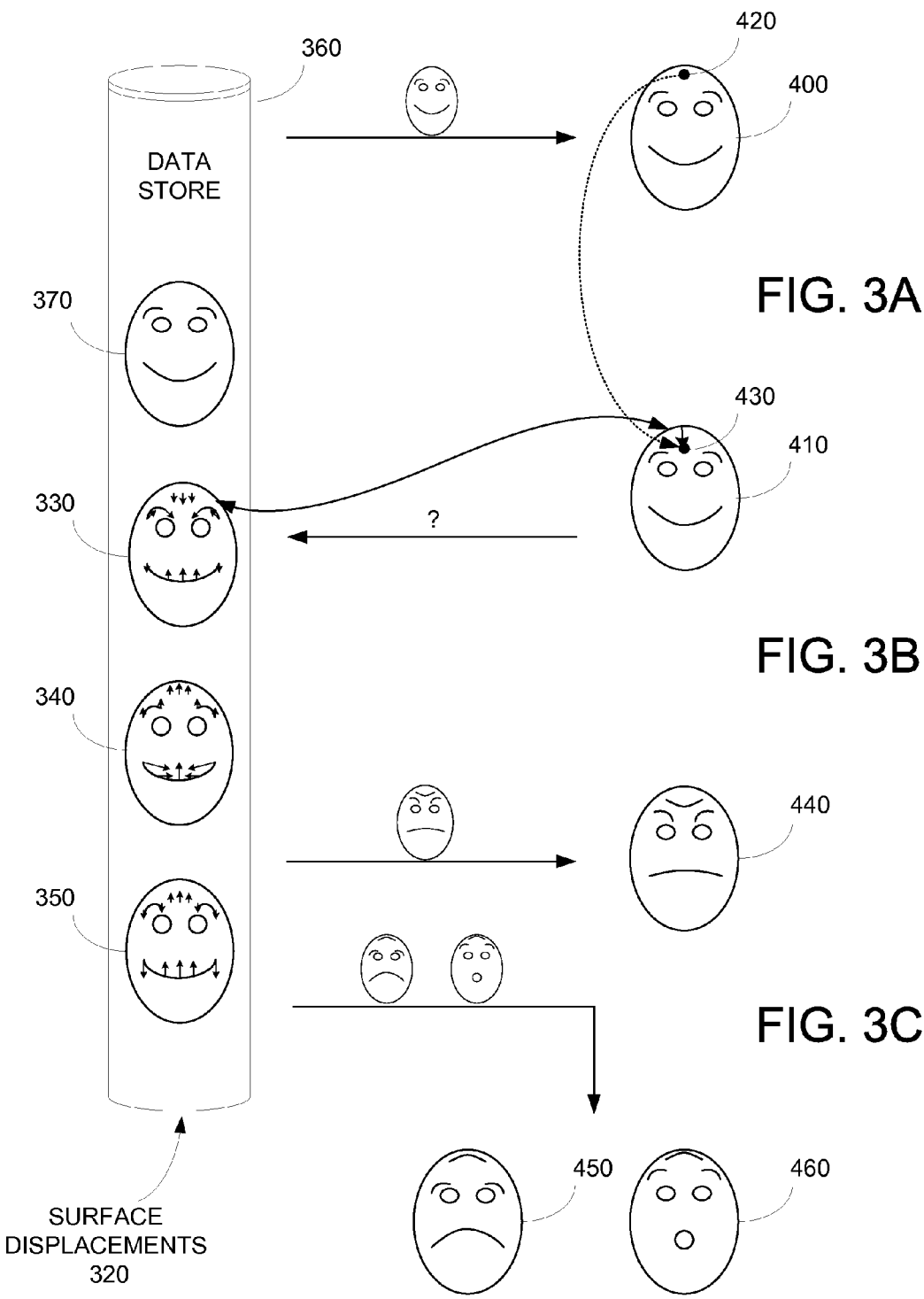

INVERSE KINEMATICS FOR MOTION-CAPTURE CHARACTERS

BACKGROUND OF THE INVENTION

The present invention relates to computer animation. More specifically, the present invention relates to computer animation based upon motion captured data.

In computer animation, a user, known as an animator, typically specifies poses for models of an object on a computer system. Based upon the specified poses with respect to time, the object may appear to be animated in a series of rendered images. The inventors of the present invention have recognized that specifying poses of objects via object models is a very time consuming process. As an example, a face of an animated character may have about 100 individually adjustable parameters that determine positions for 20,000 surface points. Accordingly, animation of a character's face, for example, is a slow and painstaking process.

To facilitate posing models of objects in a computer animation environment, the assignee of the present patent application, ImageMovers Digital has pioneered the use of physical motion capture techniques using live actors. By way of example, ImageMovers has used a combination of motion capture techniques and traditional computer animation techniques to produce feature-length films including: "The Polar Express" (2004), "Monster House" (2006), "Beowulf" (2007), which have garnered several Academy Award nominations.

The inventors of the present invention have recognized that although motion captured data may assist an animator in the animation process, animators still need to refine such animation, by hand. One reason for this, is that motion capture data, especially of the face of an actor, typically only provides low-resolution, wire-frame-like data, that provides very coarse animation data. Another reason, is that when motion captured data alone is used to drive computer animation, the resulting computer animation often looks stiff and not esthetically pleasing. Still another reason is that animation using motion capture data is typically limited to the poses that are captured.

One problem recognized by the inventors of the present invention with animators modifying motion captured data includes, that it is very easy for an animator to pose "off-model." In other words, it may be easy for an animator to stray from desired characteristic poses. As merely an example, suppose an actor was known for having a characteristic mannerism such as a wink or a smirk and that mannerism was motion-captured. In the animation process, the animator may start with the motion captured mannerism, but then may ruin such poses unintentionally when refining the animation. The resulting posed model would then be considered "off-model" because the object does not behave the way the actor did.

Accordingly what is desired are methods and apparatus for facilitating the use of motion captured data for computer animation, without the drawbacks described.

BRIEF SUMMARY OF THE INVENTION

The present invention relates to computer animation. More specifically, the present invention relates to computer animation based upon motion captured data.

In various embodiments of the present invention, motion capture data of an object, such as an actor's face, is captured in a relaxed or default pose and in a number of characteristic poses. Based upon known geometry of the motion capture devices relative to the object, a default three-dimensional object surface and posed three-dimensional object surfaces are determined. Additionally, surface displacements are determined with respect to positions on each of the posed three-dimensional object surfaces with respect to the default three-dimensional object surface. The three-dimensional object surfaces and the surface displacements are then stored in a database.

Subsequently, a two-dimensional image of the default three-dimensional object surface is displayed to the user. The user selects a first point on the image and then a second point, either by clicking on both the points or dragging the first point to the second point. In response, to the selections, a target three-dimensional displacement is determined. This target three-dimensional displacement is compared to the surface displacements stored in the database to determine one or more posed three-dimensional object surfaces that can be combined or blended to match the target three-dimensional displacement. In various embodiments, the combination of the posed three-dimensional object surfaces is based upon weighted surface displacements, wherein the energy required is reduced or minimized. A two-dimensional image of the weighted combination of the posed three-dimensional object surfaces is then determined, and displayed to a user.

According to one aspect of the invention a method for a computer system is disclosed. One technique includes receiving a surface displacement for a location on a first surface of a model of an object from a user via a user input device of the computer system, wherein the first surface of the model of the object is determined in response to a first motion captured pose of the object. A process includes determining a weighted combination of a first surface displacement group and a second surface displacement group in response to the surface displacement in the computer system, wherein the first surface displacement group is determined in response to displacements between the first surface of the model of the object and a second surface of the model of the object, wherein the second surface of the model of the object is determined in response to a second motion captured pose of the object, wherein the second surface displacement group is determined in response to displacements between the first surface of the model of the object and a third surface of the model of the object, wherein the third surface of the model of the object is determined in response to a third motion captured pose of the object. A method may include determining a fourth surface of the model of the object in the computer system in response to the first surface of the model of the object and the weighted combination of the first surface displacement group and the second surface displacement group, and displaying the fourth surface of the model of the object to the user on a display of the computer system.

According to another aspect of the invention a computer system is disclosed. One computer system includes a processor and a memory storage device having stored thereon an executable program code to cause the processor to implement a method for computer animation. The method includes receiving a surface displacement for a location on a first surface of a model of an object from a user via a user input device of the computer system, wherein the first surface of the model of the object is determined in response to a first motion captured'pose of the object. The processor can determine a weighted combination of a first surface displacement group and a second surface displacement group in response to the surface displacement in the computer system. The first surface displacement group can be determined in response to displacements between the first surface of the model of the object and a second surface of the model of the object, wherein the second surface of the model of the object is determined in response to a second motion captured pose of the object. The second surface displacement group can be determined in response to displacements between the first surface of the model of the object and a third surface of the model of the object, and the third surface of the model of the object can be determined in response to a third motion captured pose of the object. Next, the method includes determining a fourth surface of the model of the object in the computer system in response to the first surface of the model of the object and the weighted combination of the first surface displacement group and the second surface displacement group. Finally, the method includes displaying the fourth surface of the model of the object to the user on a display of the computer system.

According to yet another aspect of the invention a tangible medium having an executable program code is disclosed. The executable program code includes instructions for causing a processor to implement a method for performing computer animation. The method can include receiving a surface displacement for a location on a first surface of a model of an object from a user, wherein the first surface of the model of the object is determined in response to a first motion captured pose of an object. Next, the a weighted combination of a first surface displacement group and a second surface displacement group in response to the surface displacement can be determine, wherein the first surface displacement group is determined in response to displacements between the first surface of the model of the object and a second surface of the model of the object. The second surface of the model of the object can be determined in response to a second motion captured pose of the object, and the second surface displacement group can be determined in response to displacements between the first surface of the model of the object and a third surface of the model of the object. The third surface of the model of the object can be determined in response to a third motion captured pose of the object. Finally, a fourth surface of the model of the object can be determined in response to the first surface of the model of the object and the weighted combination of the first surface displacement group and the second surface displacement group.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 3A-D illustrate examples of various embodiments of the present invention;

DETAILED DESCRIPTION OF THE INVENTION

Figure 1:
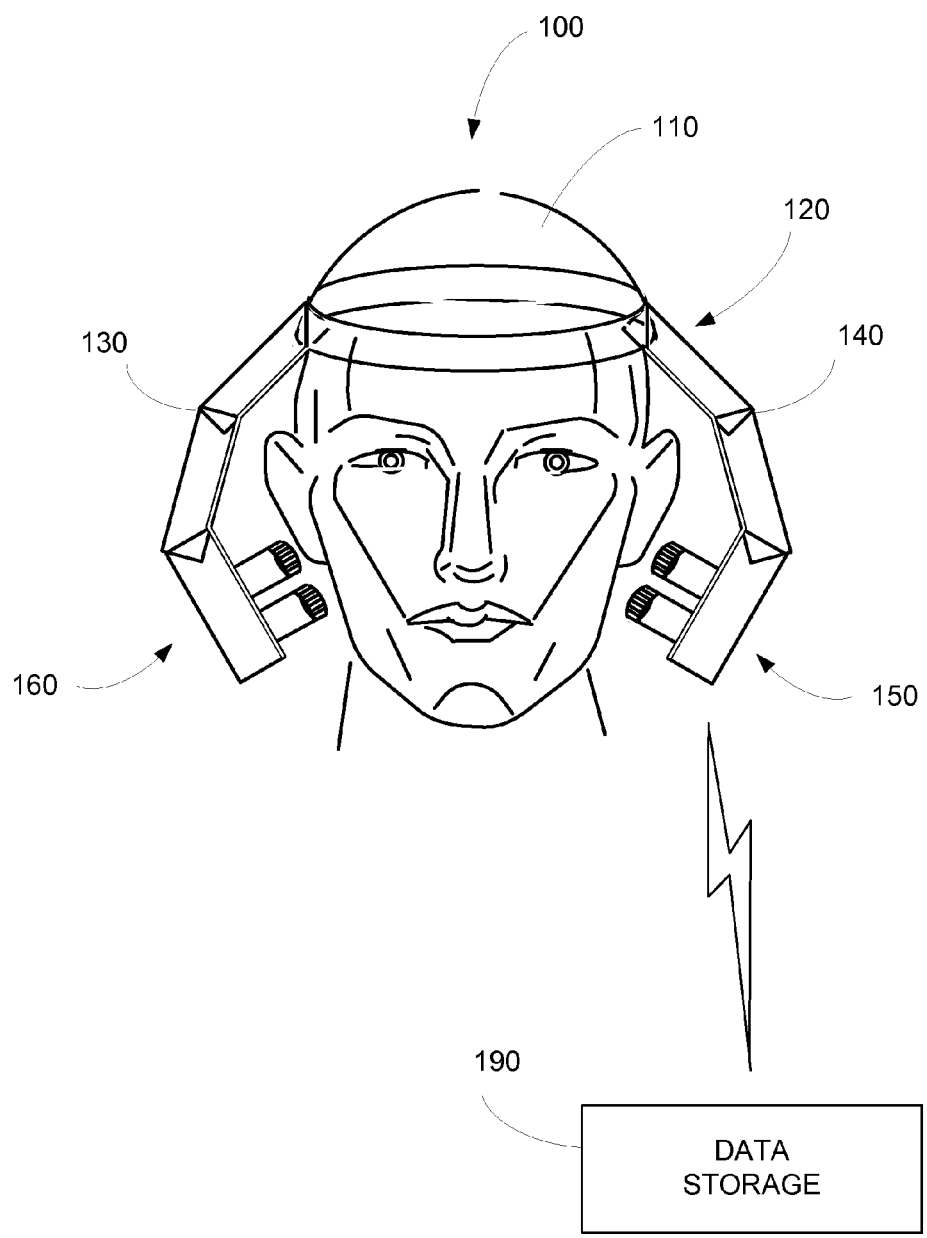
FIG. 1 illustrates a block diagram of various aspects of embodiments of the present invention.

FIG. 1 illustrates a block diagram of various aspects of embodiments of the present invention. More specifically, FIG. 1 illustrates various embodiments of a facial motion capture system.

In the embodiments illustrated in FIG. 1, a motion capture system 100 is used to capture different performances and/or poses of an object 110. In various embodiments of the present invention, object 110 may be a human actor, an animal, or other object capable of assuming different poses often with regards to time. In the example in FIG. 1, object 110 is a human actor, and motion capture system 100 is used to capture poses of the face 120 of the human actor. Merely as examples, the poses may include achieving a smile, achieving a frown, donning an angry expression, performing a wink, flashing a smirk, or the like, as will be discussed below.

In various embodiments, motion capture system 100 includes one or more camera booms 130 and 140. Additionally, each camera boom may include one or more image capture devices 150, 160. In various embodiments of the present invention, image capture devices 150, 160 may include one or more high resolution video cameras (e.g. HD resolution), or the like.

Images captured with image capture devices 150, 160 are stored in a storage unit 190, typically attached to object 110. In various embodiments, video data from image capture devices 150, 160 may be stored in storage unit 190, that may include a processing unit including a mass storage device (e.g. hard disk, SSD, etc.). Further details and embodiments of motion capture system 100 are described in the co-pending U.S. patent application Ser. No. 12/240,907, filed Sep. 29, 2008, incorporated by reference, for all purposes.

In this example, as the actor, or the like, performs directed facial poses, image capture devices 150, 160 capture images of the actor in different poses from the different vantage points. By tracking positions of markers on the face of the actor in two-dimensions, the surface of object 110 may be determined in three-dimensions.

Figure 2:
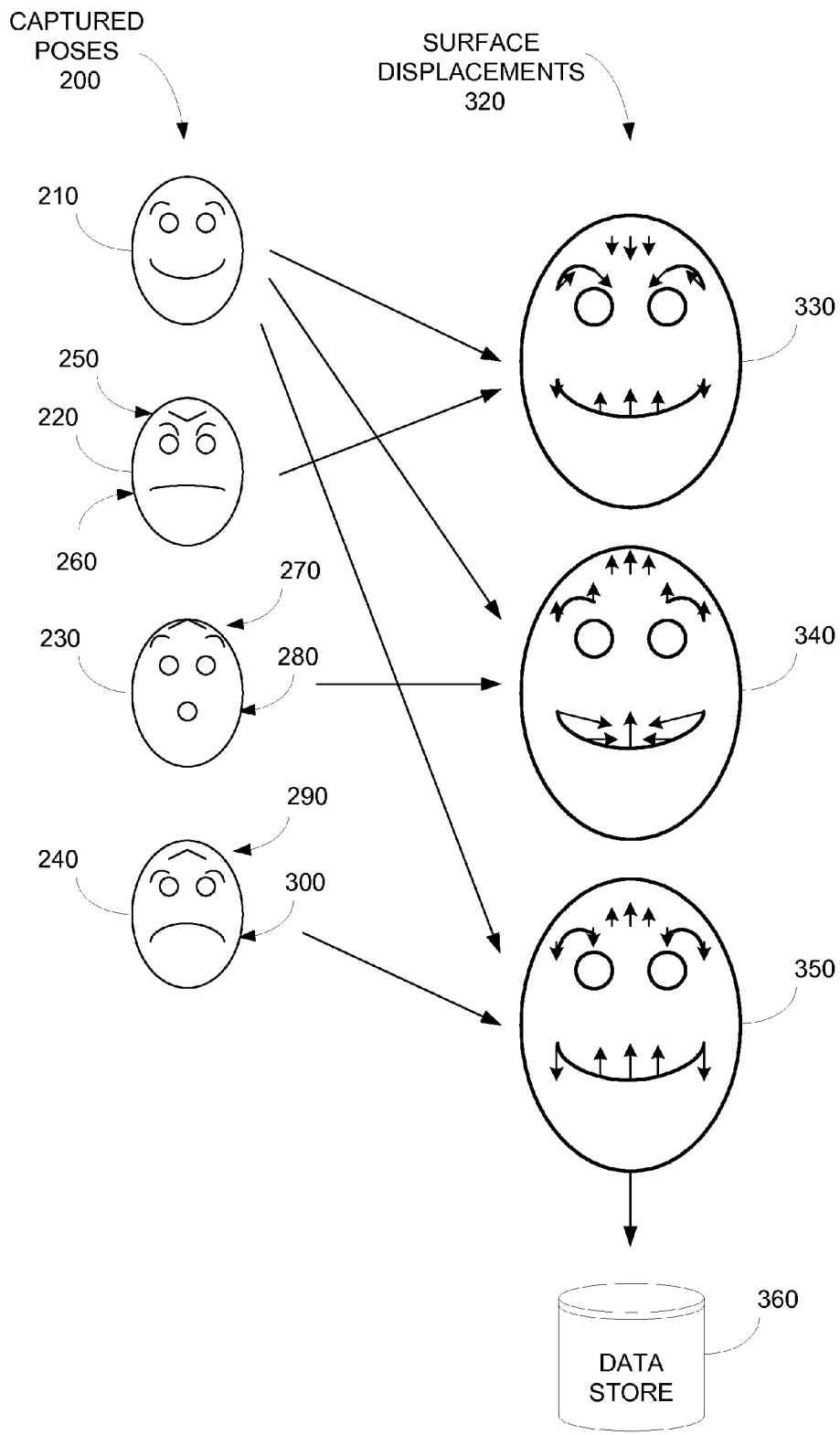
FIG. 2 illustrates an example according to various embodiments of the present invention.
Figure 4A:
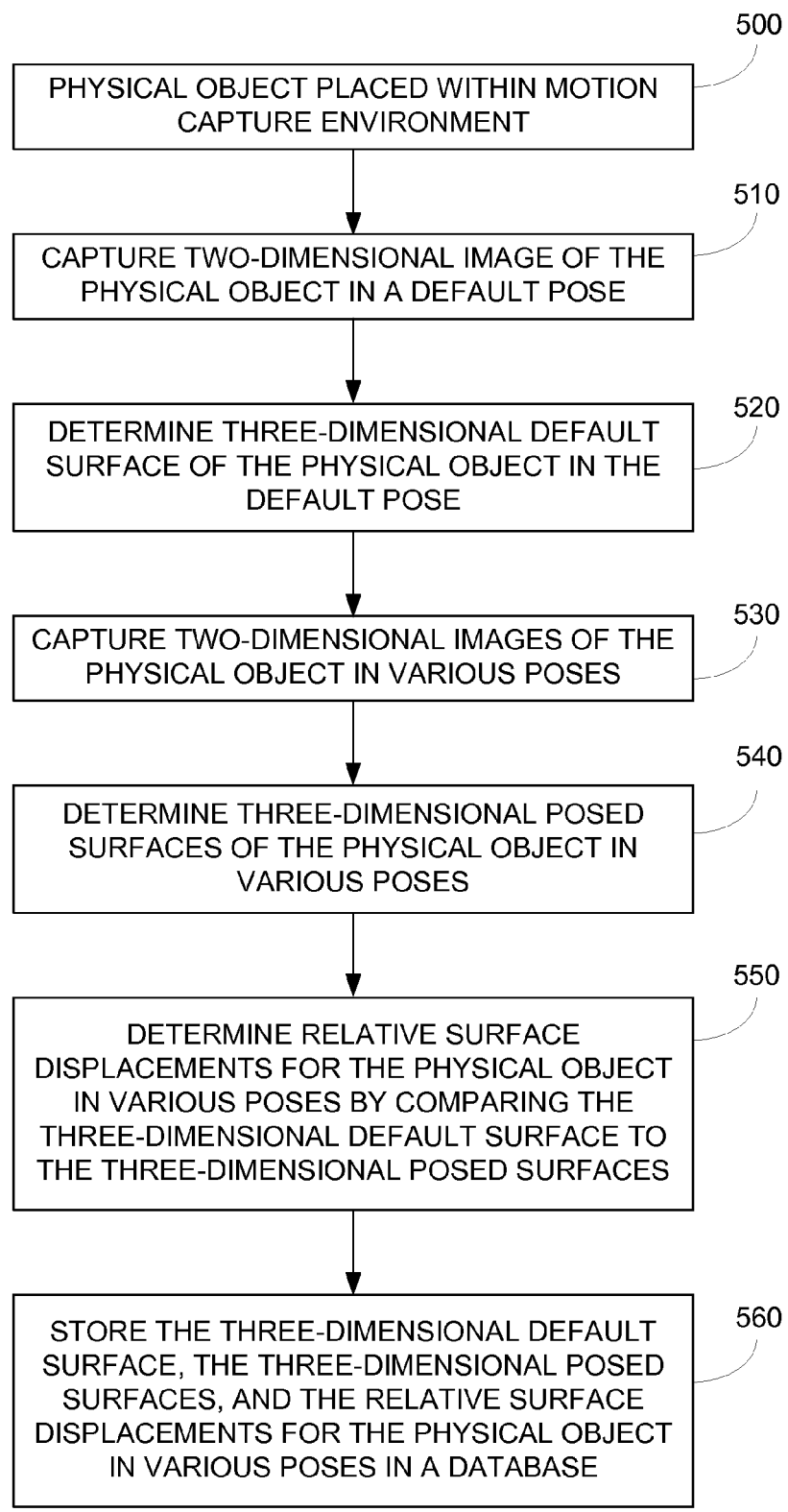
FIGS. 4A-D illustrate a block diagram of a flow chart according to various embodiments of the present invention.
Figure 4B:
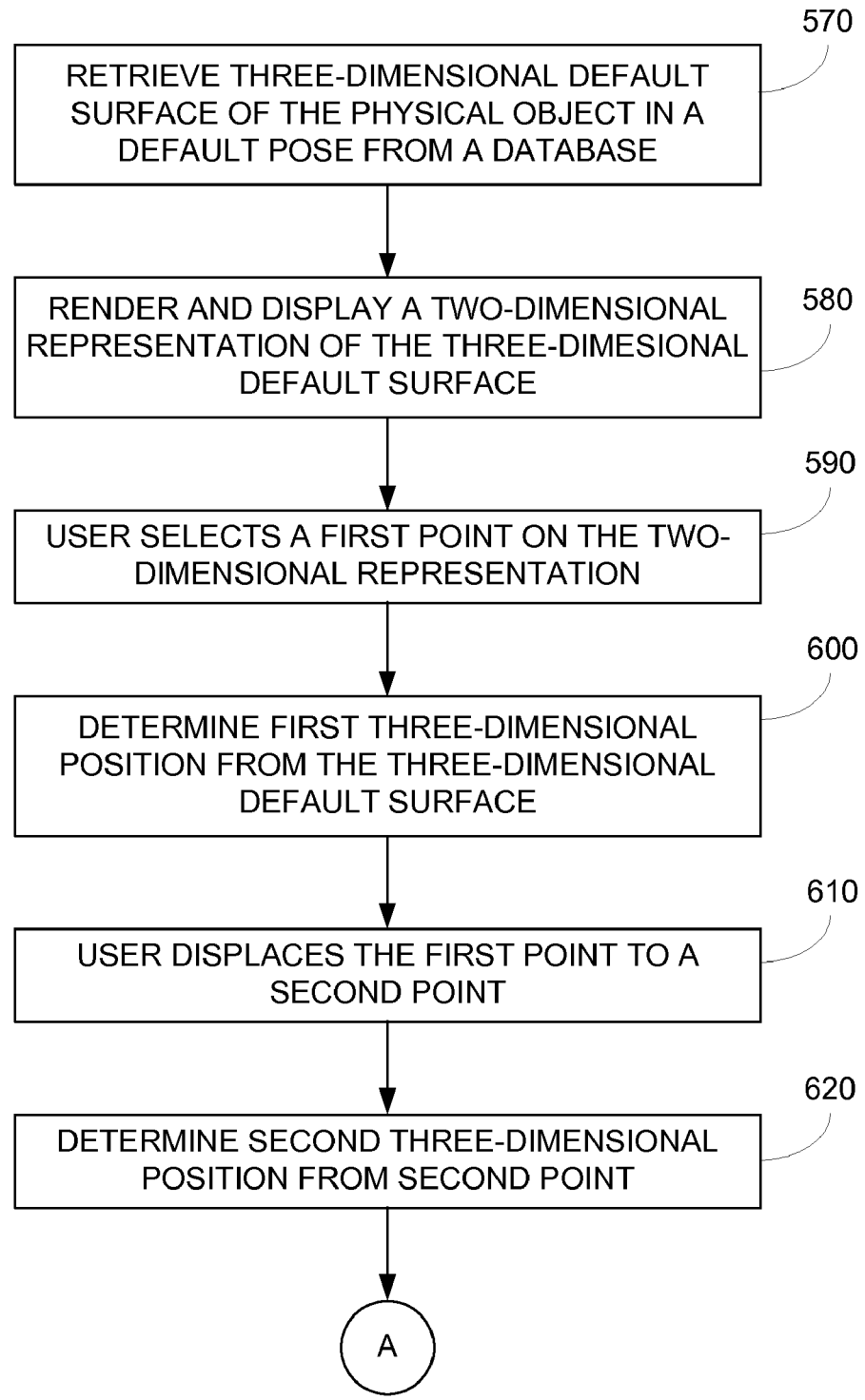
Figure 4C:
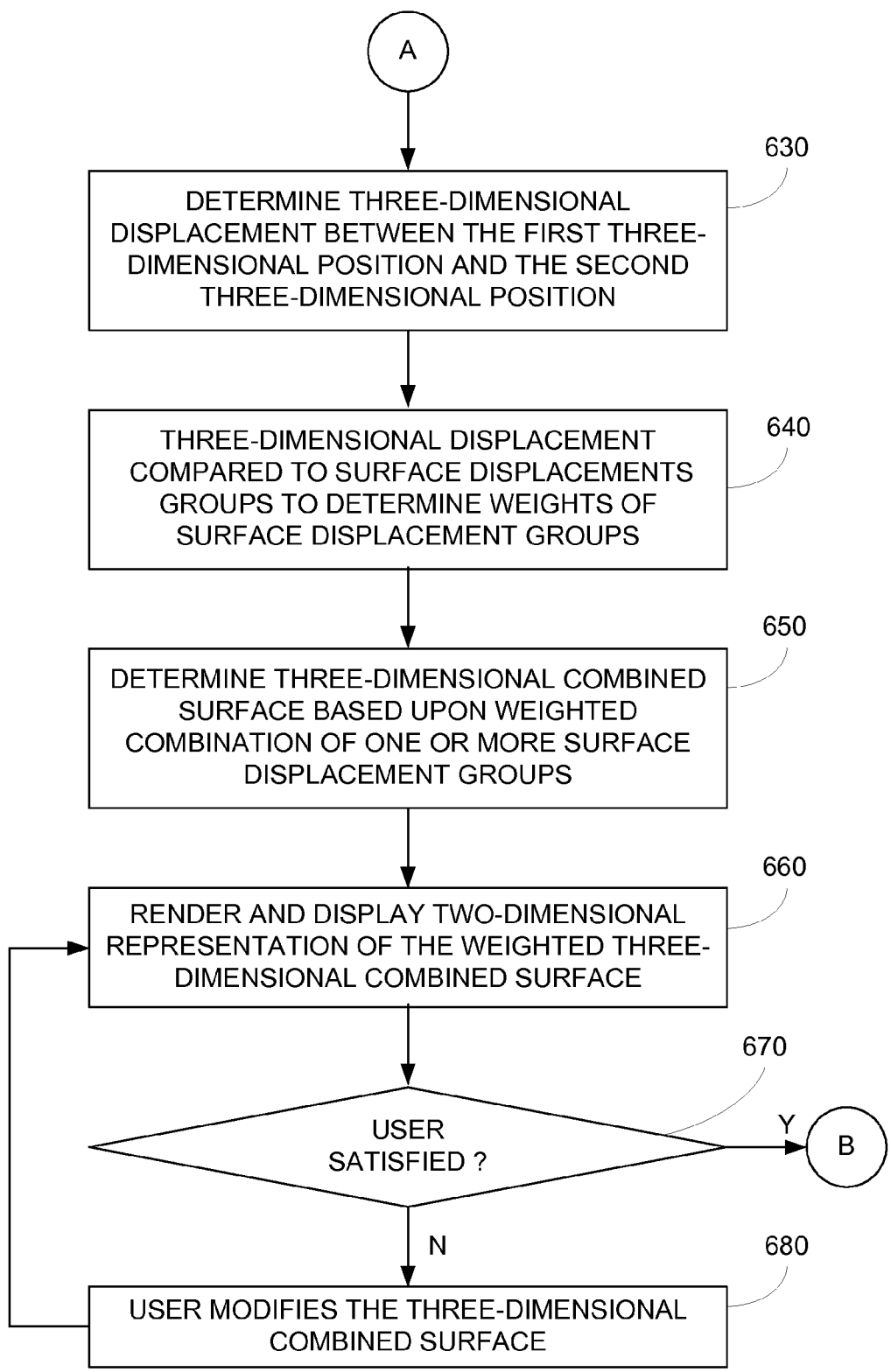
Figure 4D:
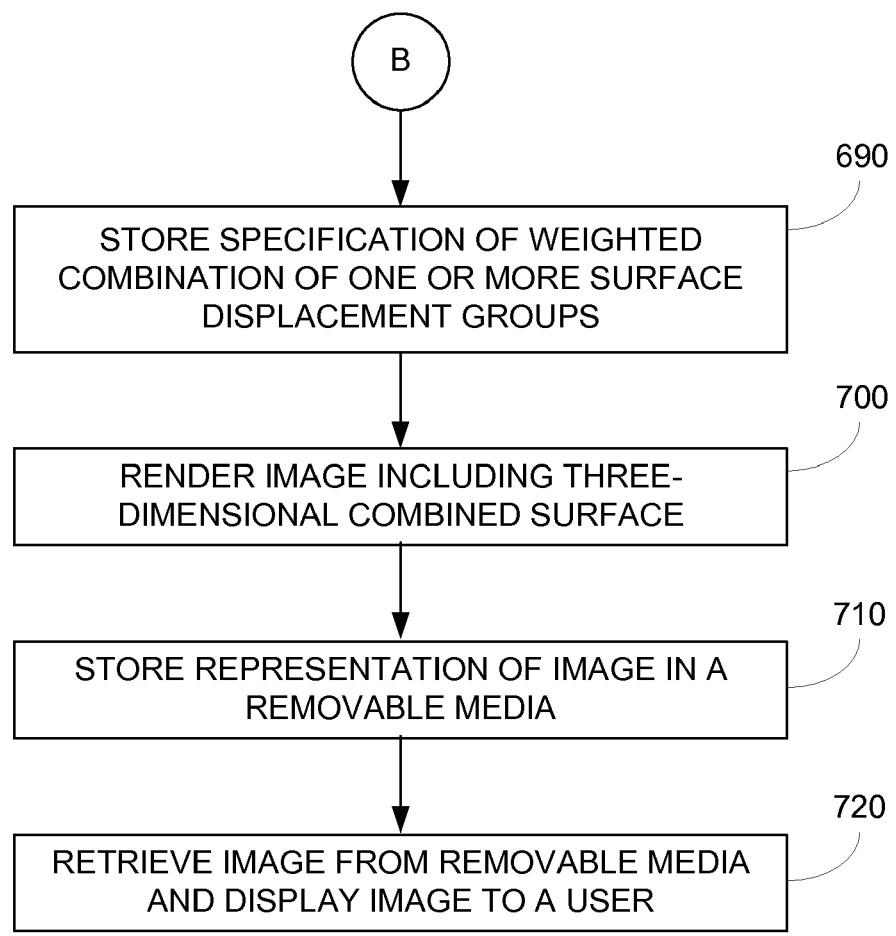

FIG. 2 illustrates an example according to various embodiments of the present invention.

Shown in FIG. 2 are a number of examples of facial poses 200 of an object, e.g. a face of an actor, or other three-dimensional object. In this example, the face of the actor is actor is told to assume any number of facial expressions, for example a relaxed or default expression 210, an angry expression 220, a surprised expression 230, a sad expression 240, and the like. In various embodiments, the number of facial expressions may be on the order of tens of facial expressions, e.g. 10, 20, 50, 80, or greater. As discussed in the co-pending U.S. patent application, any number of optical marks may be used on the face of the actor to track the position of different portions of the actor's face. In the present examples, it can be seen, that in angry expression 220, the brow is furrowed downwards 250 and the corners of the mouth are pulled downwards 260; in surprised expression 230, the brow is raised 270 and the corners of the mouth are pulled inwards 280; and in sad expression 240, the brow is raised 290, and the corners of the mouth are pulled downwards 300. In various embodiments of the present invention, the number of locations on a face that are optically tracked may be on the order of tens to hundreds, e.g. 50, 200, etc.

In various embodiments of the present invention, based upon the tracked movement of portions of the object (e.g. actor's face), three-dimensional posed surfaces are determined for each pose. Various types of surface representations may be used to represent the three-dimensional posed surfaces, such as a connectivity mesh including vertices, edges, and/or polygonal faces, or the like. In such embodiments, since the number of optical markers on the object is low, a user, such as a modeler, may have to increase the resolution of the mesh and/or fine-tune the vertex locations or polygons by hand. In other embodiments, a modeler may define a mathematical description of the surface, such as using non-uniform rational B-splines (or NURBS), polygons, subdivision surfaces (or SubDivs), or the like. In other embodiments, several different model representations may describe the surface or different parts of the surface.

In various embodiments, surface displacements are determined between the surface representation for each pose and the surface representation of the default pose. In the example in FIG. 2, surface displacement groups 320 include displacement groups 330 between the relaxed or default pose surface and the surface for angry expression 220; displacement groups 340 between the default pose surface and the surface for surprised expression 230; and displacement groups 350 between the default pose surface and the surface for sad expression 240. Additional displacement groups may be used for additional expressions.

In various embodiments of the present invention, surface displacements 320 are then stored in a data store (e.g. database) 360. In various embodiments, any number of representations may be used to represent surface displacements 320, such as one or more numeric tables, vector maps, graphical representations, or the like.

FIGS. 3A-B illustrate examples of various embodiments of the present invention. More specifically, FIGS. 3A-B illustrate use of a default or relaxed pose surface 370 and surface displacements 320.

In the Example in FIG. 3A, a user, such as an animator, retrieves a beginning pose 400 for an object, such as neutral facial pose 370 from database 360, on a display within an animation environment. In various embodiments, the surface of the object within beginning pose 400 may be represented by a mesh, a tessellation, or the like, having any number of vertices that are connected to neighboring vertices. Surfaces may also be represented by curves having control "knots," of the like. In various embodiments, the animation environment may be any conventional or proprietary animation environment, such as Maya (Autodesk), Menv (Pixar), or the like. In other embodiments of the present invention, other poses than a "neutral pose" may also be used during this process. For example, a beginning pose may be an ending pose from a previous animation sequence; the beginning pose may be a preset pose (e.g. angry, happy, sad, or the like); or any other pose.

Next, using any conventional computer user interface device, the user (e.g. animator) may deform the beginning pose. For example, as illustrated in deformed pose 410, the user has selected a point 420 on the forehead of beginning pose 400, and "pulled it down" the face to location 430, FIG. 3B. In various embodiments, this may be accomplished by selecting a vertex or surface of the mesh, tessellation, or the like of the surface, and dragging the point or geometric feature. In some embodiments, point 420 may be perturbed or modified in two-dimensional space, or three-dimensional space, depending upon the specific requirements. For example, point 420 may be moved or perturbed "up," "down," "left" or "right" along the surface of the object; point 420 may be moved "into" or "out" of the surface of the object; or point 420 may be perturbed in any of a combination of directions, described above.

In various embodiments of the present invention, in response to the movement of the point, the system refers to surface displacement groups 320 stored in database 360 for a match or combination, FIG. 3B. More specifically, the system attempts to determine one or more modeled surface displacements 320 that approximately match the surface displacement of point 420 on the default surface moved to point 430.

In the present example, the system determines that surface displacement group 330 associated with angry expression 220 has a surface displacement or movement, e.g. the center of the forehead of the face is furrowed. In various embodiment, this may be a numeric match, a graphical match, or the like. Next, surface displacement group 330 is applied to remaining control points on default surface 370, and the object becomes pose 440, FIG. 3C. In other embodiments, the surface for posed expressions may also be stored in data store 360, and retrieved when there is a surface displacement match.

In some examples, as illustrated in FIG. 3D, more than one surface may be "matched" based upon the surface displacement. For example, the animator specified displacement may match surface displacements of more than one weighted surface displacement group. In this example, surface displacement group 340 and surface displacement group 350 may each match the animator input (e.g. raising a point on the forehead). In such a case, the user, e.g. animator may be prompted to select which surface displacement group to use. Based upon the user selection, as discussed above, the surface is retrieved or reconstructed from data store 360.

The examples in FIGS. 3A-C illustrate specification of a surface associated with a single object pose. However, as will be discussed further below, more typically, a weighted combination of surface displacement groups associated with more than one object pose will be used. For example, based upon a user-specified surface displacement, the system may determine that the input surface displacement should be represented by a 90% weighting of a surface displacement group of a sad pose, for example, a 5% weighting of a surface displacement group of an angry pose, and a 5% weighting of a surface displacement group of an indifferent pose.

FIGS. 4A-D illustrate a block diagram of a flow chart according to various embodiments of the present invention Initially, an object, such as an actor is placed within a motion capture environment, step 500. In various examples, the object, e.g. human actor, articulated object, animal, or the like is typically equipped with a number of motion capture points, e.g. reflective balls, reflective paints, black dots, etc. and placed within the field of view of a number of motion capture sensors, e.g. visible light cameras, infrared light cameras, or the like. In various embodiments, the captured motion may be of an actor's face, hands, or any portion of the body.

Within the motion capture environment, the object assumes a default or relaxed poses or expression, step 510. Based upon the motion capture points, and predefined geometry of the motion capture environment, optics of the motion capture sensors, and the like, the three-dimensional surface positions of the motion capture points are determined for the default/relaxed pose, step 520. In various embodiments, the surface may be mathematically defined by a user, e.g. a modeler, based upon the data captured in step 510. In various embodiments, the number of motion capture points is relatively low, thus a user may have to supplement these data points to further define the default surface of the object.

Next, within the motion capture environment, the object assumes one or more characteristic poses, or performs one or more characteristic movements, step 530. Similar to the above, based upon the motion capture points, and predefined geometry of the motion capture environment, optics of the motion capture sensors, and the like, the three-dimensional surface positions of the motion capture points are determined for the poses in step 530, step 540.

In various embodiments, for each characteristic pose for the object, surface displacement groups relative to a default surface are then determined, step 550. In some embodiments, the surface displacement groups may be determined based upon the three-dimensional positions of the motion capture points. As an example, the displacement of corners of a mouth may be determined relative to a default pose for the object in different poses. In some embodiments, the displacements may be semi-automatically determined by the computer based upon pattern matching algorithms, and/or may be assisted by a user visually mapping positions of motion capture points between the default surface and the characteristic pose surface. In various embodiments, the surface displacement groups may include two or three-dimensional vectors.

In various embodiments, the three-dimensional surface positions of the surface in the default position, and the relative surface displacement groups for each characteristic pose compared to the default pose are stored, step 560. In various embodiments, the data may be stored as a data table, such as a vector field, graphically, or the like, where selected surface position may be associated with a displacement amount and a direction. A simple illustration of the relative surface displacement groups was shown in FIG. 2, as surface displacement groups 330-350. As can be seen in surface displacement group 350, to form sad expression 240 from default expression 210, the corners of the mouth are dropped, the lips are displaced upwards, the eyebrows are dropped, and the forehead is raised. In various embodiments, the number of surface displacements in a surface displacement group may be on the order of 50, 100, 200, or the like. In addition to storing this data for each pose, in various embodiments, the three-dimensional surfaces of the object for each characteristic pose may also be stored into data store 360, e.g. a database.

Subsequent to the storing of data to the database, the surface position for the object in the default pose may be retrieved from data store 360, step 570. An image is then rendered based upon the surface data, and displayed to a user, e.g. an animator, step 580. In various embodiments, the rendering may be a simple wire-frame rendering to a higher-quality rendering. The image may visually include a number of control points corresponding to the motion capture points or the like. As an example, the default surface positions may have an associated surface lattice structure, or the like, and the control points are vertices.

As the user views the surface of the default surface positions, the user may select one or more points on the image, step 590, that are mapped to a control point e.g. vertex, triangle, square, control point or the like, on the surface, step 600. In various embodiments, the user may perform this via a mouse, stylus, or the like. Next, the user moves or displaces the one or more points on the two-dimensional image, step 610. This displacement is then mapped to a destination position in three-dimensional space, step 620. In various examples, the user may be constrained to move along the surface of the object, or into the surface of the object, or out of the surface of the object, or any other combination of movement, based upon the movement of the point on the image. Accordingly, the movement may be considered within two-dimensional or three-dimensional space.

Next, in various embodiments of the present invention, three-dimensional displacements and directions are determined for movement of the one or more control points, step 630. The three-dimensional displacements and directions for the one or more control points are then compared to the surface displacement groups stored in data store 360 to determine a combination of one or more surface displacement matches, step 640. In various embodiments of the present invention, various matching algorithms may be used to determine a combination of surface displacement groups in data store 360 that approximately match the surface displacements determined in step 640. In some embodiments; a least squared error function is can be used. As merely an illustrative example, if input surface displacements are determined in step 640 of {0.5,0.8,0.8,0,0,0}, the system may mathematically determine that a 25% weighting of a first surface displacement group (associated with a first pose) of {1,0,0,0,0.4, 0.4} and a 75% weighting of a second surface displacement group (associated with a second pose) of {0,1,1,0,0,0} would be a good match or the best match. In other embodiments, many other types of matching algorithms may be adapted for use with the present invention to determine a combination of the surface displacement groups. For example, a least energy function could be used to determine the weighted combination of surface displacement groups that requires the least amount of surface displacements to match the input surface displacements.

In various embodiments, the weights are then applied to the respective surface displacements in the surface displacement groups to determine surface displacements for the remaining control points on the default surface, or the like, to determine a weighted surface, step 650. Continuing the example above, a 25% weight of the first surface displacement group and a 75% weighting of the second surface displacement group may result in surface displacements of {0.25,0.75,0.75,0.1, 0.1}. Accordingly, the weighted surface displacements would be 25% of the first pose and 75% of a second pose. In various embodiments, the weighted surface displacements are expected to be much closer to the input surface displacements, than the illustrative embodiment.

In various embodiments, an image of the weighed surface is then rendered and displayed to the user, step 660. As discussed above, the rendering step may be virtually any level of desired quality, from wire-frame or mesh, to film-quality rendering, or the like. Continuing the example discussed above, if the first pose is a surprised pose and the second pose is a happy pose, it is expected that the object will appear to have a happy expression with some surprised characteristics.

In various embodiments, if more than one combination of weighted surfaces have similar surface displacements, the user may be prompted to select which weighted surfaces of the object will be used. For example, if two or more weighted combinations of surface displacement groups have similar or same least squared values, least energy values, or the like, the weighted combinations may be presented to the user for them to choose. In various embodiments, if the user is not satisfied with the weighted surface, step 670, the user may specify displacements to additional control points of the default surface (cumulatively), and return to step 590. Alternatively, the user may directly modify the weighted surface, step 680, by selecting and moving control points of the weighted surface.

In various embodiments, if the user is satisfied, the weighted surface displacement groups may be stored in a memory for subsequent rendering, step 690. Later, in various embodiments, the default surface as well as weighted surface displacement groups may be retrieved from memory and used for rendering an image including the posed object, step 700. This rendering step may be for pre-production visualization, production rendering, or the like for an animated feature; for immediate display (e.g. for computer gaming, entertainment); or the like. Representation of rendered images that are determined may be displayed to the user and/or stored in a transportable or removable memory, e.g. hard-disk, optical-disk, film media, or the like, step 710. The rendered images are then retrieved from the memory and displayed to a user (e.g. at a public theater, home theater, computer display, or the like), step 720.

Figure 5:
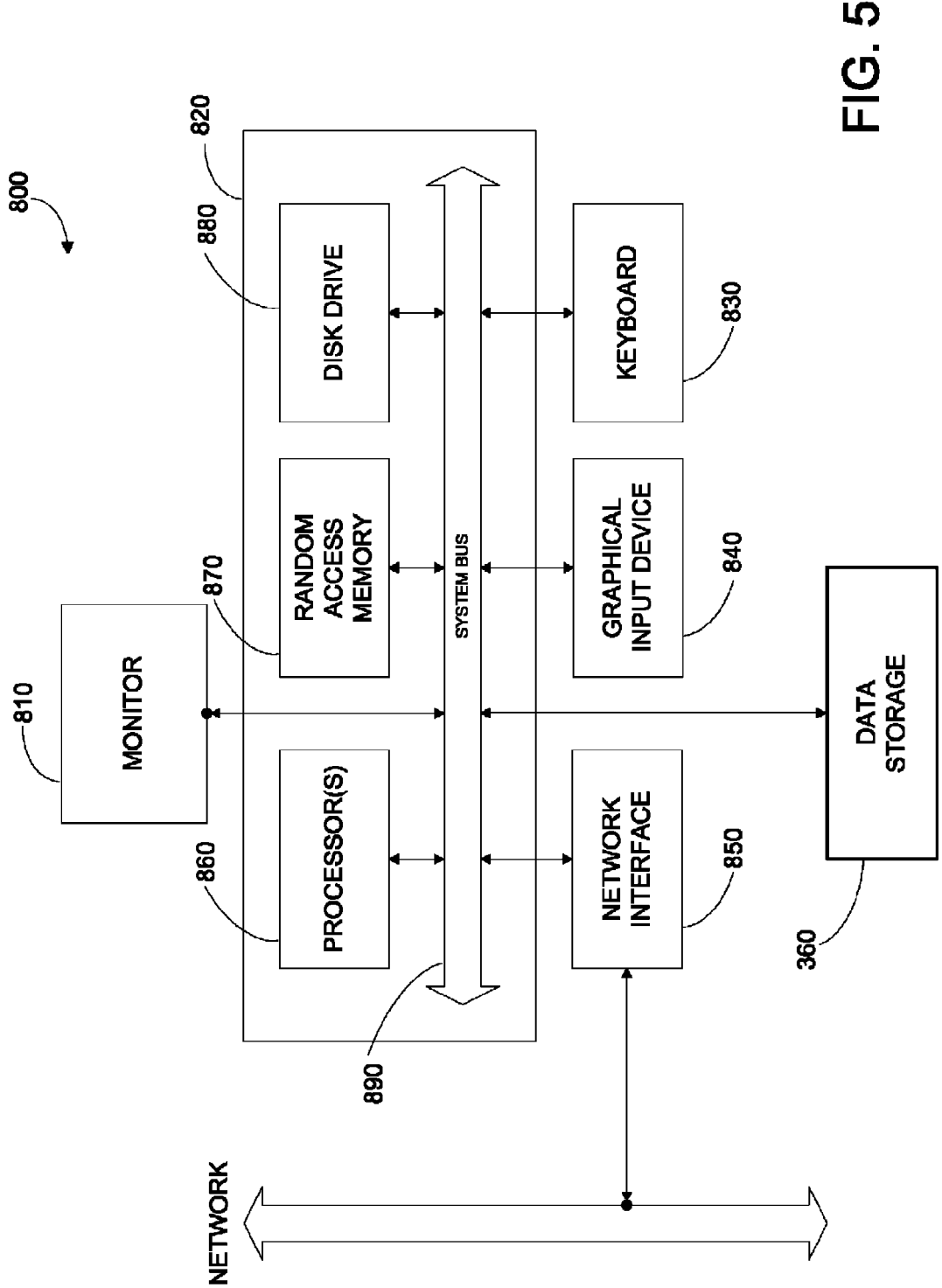
FIG. 5 is a block diagram of typical computer system according to various embodiments of the present invention.

FIG. 5 is a block diagram of typical computer system 800 according to various embodiment of the present invention. In various embodiments, computer system 800 typically includes a monitor 810, computer 820, a keyboard 830, a user input device 840, a network interface 850, and the like.

In the present embodiment, user input device 840 is typically embodied as a computer mouse, a trackball, a track pad, wireless remote, and the like. User input device 840 typically allows a user to select objects, icons, text, control points and the like that appear on the monitor 810. In some embodiments, monitor 810 and user input device 840 may be integrated, such as with a touch screen display or pen based display such as a Cintiq marketed by Wacom.

Embodiments of network interface 850 typically include an Ethernet card, a modem (telephone, satellite, cable, ISDN), (asynchronous) digital subscriber line (DSL) unit, and the like. Network interface 850 are typically coupled to a computer network as shown. In other embodiments, network interface 850 may be physically integrated on the motherboard of computer 820, may be a software program, such as soft DSL, or the like.

Computer 820 typically includes familiar computer components such as a processor 860, and memory storage devices, such as a random access memory (RAM) 870, disk drives 880, and system bus 890 interconnecting the above components.

In one embodiment, computer 820 is a PC compatible computer having multiple microprocessors such as Xeon™ microprocessor from Intel Corporation. Further, in the present embodiment, computer 820 typically includes a UNIX-based operating system.

RAM 870 and disk drive 880 are examples of tangible media for storage of animation asset data, audio/video files, computer programs, operating system, embodiments of the present invention, including rendering engines, executable program code, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like, including data storage 360.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 5 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

In light of the above disclosure, one of ordinary skill in the art would recognize that many variations may be implemented based upon the discussed embodiments. For example, embodiments of the present invention may be directed towards real-time computer animation, such as found in video games. Similar to the process described above, characteristic surface displacement groups for an object (e.g. facial poses) are determined, and stored in a database. Next, during gameplay, the player may specify a surface displacement for an object (e.g. petting a virtual animal, touching a virtual patient, or the like). In response, the most appropriate weighting of surface displacement groups are determined, and the surface of the object is modified accordingly. In other embodiments, the computer game itself may select the particular pose by specifying a displacement, or the like on the surface. For example, in a warfare-type game, if the left side of a character's face is hit by shrapnel, for example, the system may determine a weighted surface displacement group based upon a pose where the character's left eye is closed. Over several frame times, the weight may increase resulting in the character's face achieving a left-eye closed pose.

In other embodiments of the present invention, the teaching discussed may be applied to other portions of an object than illustrated above, such as: a human hand, a human body, a face of an animal, or the like. As discussed above, the surface displacement groups are based upon motion capture data of the physical object in a relaxed or default pose, compared to motion capture data of the physical object performing characteristic poses, or the like.

It should be understood that "rendering" may refer to a high quality process of converting an image from a mathematical description of a scene using a program such as Pixar's RenderMan®. Additionally, "rendering" may refer to any graphical visualization of the mathematical description of the scene, or any conversion of geometry to pixels, for example "rendering" with a lower quality rendering engine, or the like, such as GL and GPU hardware and software renderers, and the like. In some embodiments of the present invention, this type of real-time rendering may be used for entertainment programs, such as computer of console gaming. In various embodiments, the rendered object may be incorporated into computer animation, computer generated imagery, into live-action scenes, or the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope.

What is claimed is:

1. A method for a computer system comprising:
   receiving a surface displacement for a location on a first surface of a model of an object from a user via a user input device of the computer system, wherein the first surface of the model of the object is determined in response to a first motion captured pose of the object;
   determining a weighted combination of a first surface displacement group and a second surface displacement group in response to the surface displacement in the computer system, wherein the first surface displacement group is determined in response to displacements between the first surface of the model of the object and a second surface of the model of the object, wherein the second surface of the model of the object is determined in response to a second motion captured pose of the object, wherein the second surface displacement group is determined in response to displacements between the first surface of the model of the object and a third surface of the model of the object, wherein the third surface of the model of the object is determined in response to a third motion captured pose of the object;

determining a fourth surface of the model of the object in the computer system in response to the first surface of the model of the object and the weighted combination of the first surface displacement group and the second surface displacement group; and displaying the fourth surface of the model of the object to the user on a display of the computer system.

2. The method of claim 1 wherein determining the weighted combination comprises using a cost function selected from a group consisting of: a least squares and an energy function.

3. The method of claim 1 further comprising:
posing the object in the first motion captured pose, wherein the object includes a plurality of physical markers;
capturing a plurality of images of the object in the first motion captured pose, wherein the plurality of images includes locations of physical markers from the plurality of physical markers; and
determining the second surface of the model of the object in response to the plurality of images.

4. The method of claim 1 further comprising:
determining the location on the first surface of the model of the object from the user via a user input device, wherein the location is associated with a surface descriptor;
determining another location from the user via the user input device; and
determining the surface displacement and a direction in response to the location and the other location.

5. The method of claim 1
wherein the surface descriptor comprises a wire-frame model comprising a plurality of vertices; and
wherein the surface displacement comprises a displacement of at least one vertex from the plurality of vertices.

6. The method of claim 1 further comprising:
rendering an image in response to the fourth surface of the model of the object;
storing a representation of the image in a tangible memory; and
displaying the image retrieved from the tangible memory to a user on a display;
wherein the tangible memory is selected from a group consisting of: an optical storage medium, a magnetic storage medium, an electrical storage medium, film medium.

7. A tangible media having stored thereon a executable program code for causing a processor to implement the method comprising:
receiving a surface displacement for a location on a first surface of a model of an object from a user, wherein the first surface of the model of the object is determined in response to a first motion captured pose of the object;
determining a weighted combination of a first surface displacement group and a second surface displacement group in response to the surface displacement, wherein the first surface displacement group is determined in response to displacements between the first surface of the model of the object and a second surface of the model of the object, wherein the second surface of the model of the object is determined in response to a second motion captured pose of the object, wherein the second surface displacement group is determined in response to displacements between the first surface of the model of the object and a third surface of the model of the object, wherein the third surface of the model of the object is determined in response to a third motion captured pose of the object; and determining a fourth surface of the model of the object in response to the first surface of the model of the object and the weighted combination of the first surface displacement group and the second surface displacement group.

8. The tangible media of claim 7 wherein the method further comprises:
determining the location on the first surface of the model of the object from the user, wherein the location is associated with a surface descriptor;
determining another location from the user; and
determining the surface displacement and a direction in response to the location and the other location.

9. The tangible media of claim 7 wherein the surface descriptor comprises a wire-frame model comprising a plurality of vertices and wherein the surface displacement comprises a displacement of at least one vertex from the plurality of vertices.

10. The tangible media of claim 7 wherein the method further comprises rendering an image in response to the fourth surface of the model of the object.

11. The tangible media of claim 10 where the method further comprises storing a representation of the image in another tangible medium, wherein the other tangible medium is selected from a group consisting of: an optical storage medium, a magnetic storage medium, an electrical storage medium and a film medium.

12. A computer system comprising a processor coupled to a memory storage device, wherein the memory storage device has stored thereon an executable program code to cause the processor to implement a method comprising:
receiving a surface displacement for a location on a first surface of a model of an object from a user via a user input device of the computer system, wherein the first surface of the model of the object is determined in response to a first motion captured pose of the object;
using the processor to determine a weighted combination of a first surface displacement group and a second surface displacement group in response to the surface displacement in the computer system, wherein the first surface displacement group is determined in response to displacements between the first surface of the model of the object and a second surface of the model of the object, wherein the second surface of the model of the object is determined in response to a second motion captured pose of the object, wherein the second surface displacement group is determined in response to displacements between the first surface of the model of the object and a third surface of the model of the object, wherein the third surface of the model of the object is determined in response to a third motion captured pose of the object;
determining a fourth surface of the model of the object in the computer system in response to the first surface of the model of the object and the weighted combination of the first surface displacement group and the second surface displacement group; and
displaying the fourth surface of the model of the object to the user on a display of the computer system.

13. The computer system of claim 12 wherein the method further comprises:

determining the location on the first surface of the model of the object from the user via a user input device of the computer system, wherein the location is associated with a surface descriptor;

determining another location from the user via the user input device; and determining the surface displacement and a direction in response to the location and the other location.

14. The computer system of claim 12 wherein the surface descriptor comprises a wire-frame model comprising a plurality of vertices and wherein the surface displacement comprises a displacement of at least one vertex from the plurality of vertices.

15. The computer system of claim 12 wherein the method further comprises:

rendering an image in response to the fourth surface of the model of the object; and displaying the image to a user on a display.

16. The computer system of claim 15 where the method further comprises storing a representation of the image in a tangible memory, wherein the tangible memory is selected from a group consisting of: an optical storage medium, a magnetic storage medium, an electrical storage medium and a film medium.

* * * * *

UNITED STATES PATENT AND TRADEMARK OFFICE
CERTIFICATE OF CORRECTION

| | | |
|---|---|---|
| PATENT NO. | : 8,334,872 B2 | Page 1 of 1 |
| APPLICATION NO. | : 12/495488 | |
| DATED | : December 18, 2012 | |
| INVENTOR(S) | : Doug Epps and Nate Reid | |

It is certified that error appears in the above-identified patent and that said Letters Patent is hereby corrected as shown below:

IN THE CLAIMS

In claim 5, column 11, line 36, please delete "claim 1" and insert --claim 4--, so that the line reads:

> The method of claim 4 further comprising

In claim 9, column 12, line 20, please delete "claim 7" and insert --claim 8--, so that the line reads:

> The tangible media of claim 8 where in the surface

Signed and Sealed this
Twenty-sixth Day of January, 2016

Michelle K. Lee
*Director of the United States Patent and Trademark Office*